Patented June 29, 1954

2,682,472

UNITED STATES PATENT OFFICE 2,682,472

BOILED ICING AND METHOD OF MAKING THE SAME

Wiltz Walker Wagner, New Orleans, La.

No Drawing. Application July 2, 1951,
Serial No. 234,909

11 Claims. (Cl. 99—139)

This invention relates to boiled icings and components for making the same as well as methods of making said components and icings, and particularly relates to boiled icings that are stable and non-separating.

Boiled icings as heretofore produced in the art have always had a tendency to break down, weep and separate, thus giving products which were unsatisfactory and which could not successfully meet the requirements for entities capable of shipment.

Among the objects of the present invention is the production of boiled icings and components therefor, that yield stable icings which may be packaged and sold in commerce.

Other objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention, a stable boiled icing base is produced which may be incorporated into a sugar sirup to produce a boiled icing of the desired character. The boiled icing base is made by utilizing an edible albumen such as egg albumen, and an edible water-soluble gum such as gum acacia (gum arabic) which are incorporated by intimate mixing with mineral components, flavoring ingredients, sugar and starch. A typical illustrative formulation is the following, parts being by weight:

| | |
|---|---|
| Egg albumen | 35# |
| Gum acacia | 1# |
| Calcium sulphate | 1# |
| Sodium aluminum sulphate | 5# |
| Vanillin | 3 oz. |
| Coumarin | ½ oz. |
| Powdered sugar | 19# |
| Starch | 39# |

The order in which these ingredients are added and mixed is important. The egg albumen and gum acacia are thoroughly mixed together for example for five minutes, the mineral ingredients are then intimately incorporated as by mixing for two minutes, the flavoring ingredients are then mixed in, and finally the sugar and starch (both sifted) incorporated by mixing. The resulting composition is a boiled icing base in the form of a fine white powder that is slightly hygroscopic that may be utilized as an entity in commerce and used in the production of boiled icings. The calcium sulphate and sodium aluminum sulphate serve to control the moisture and grain of the finished product. The proportions of the stated components employed may vary within reasonable limits as for example from 3 to 5% more or less from those given, but should be such as to give an icing base of the desired character. The flavoring components may of course be varied.

The icing base desirably with added sugar and water is incorporated with a sugar sirup to produce the boiled icing. The latter is a stable non-separating product of fine grain, fluffy, and smooth. It may be packaged and shipped for sale and consumption as desired. Such products may be used for consumer sales, on package shelves, as well as in barrels for large consumers such as large bakeries.

The following is a typical exemplary formulation for producing a boiled icing from the icing base as given above. A sugar sirup is produced for example from

A.

| | |
|---|---|
| Granulated sugar | oz. by weight 28 |
| Glucose | oz. 10 |
| Water | oz. 8 | by heating in an open kettle to 200° F.

The icing base mix may be as follows (in parts by weight):

B.

| | Ounces |
|---|---|
| Granulated sugar | 4 |
| Icing base as above | 3 |
| Water | 4 |
| Pinch of salt. | |
| Vanilla to taste. | |
| Gelatin | ½ |

These latter ingredients are thoroughly mixed and added to the sugar sirup while the latter is at 200° F. Desirably the icing base mix is added portionwise to the sugar sirup with thorough mixing as for 5 or 6 minutes before the next portion is added. For best results, the temperatures specified should be used.

Having thus set forth my invention, I claim:

1. A stable boiled icing base comprising egg albumen, an edible water soluble gum, calcium sulphate, sodium aluminum sulphate, powered sugar and starch and flavoring ingredients in proportions to give an icing base, in the form of a fine white powder.

2. The icing base of claim 1 in which the gum is gum acacia.

3. A stable non-separating boiled icing comprising the base of claim 1 incorporated with a sugar sirup and flavoring ingredients in amount to give a stable, fluffy, smooth boiled icing of fine grain.

4. The icing of claim 3 in which the gum is gum acacia.

5. A method of making a stable boiled icing base which comprises mixing in proportions to give an icing base, egg albumen and an edible water soluble gum, then incorporating calcium sulphate and sodium aluminum sulphate, adding desired flavoring components, and then incorporating powdered sugar and starch to give a fine white powder.

6. The method of claim 5 in which the gum is gum acacia.

7. The method of making a stable non-separating boiled icing which comprises heating a sugar sirup to about 200° F. and incorporating therewith by mixing the icing base of claim 1 in proportions to give a stable, fluffy, smooth boiled icing of fine grain.

8. The method of making a stable non-separating boiled icing which comprises heating a sugar sirup to about 200° F. and incorporating therewith by mixing the icing base of claim 1 in proportions to give a stable, fluffy, smooth boiled icing of fine grain.

9. The method of making a stable non-separating boiled icing which comprises heating a sugar sirup composed of sugar, glucose, and water to about 200° F. and incorporating by mixing therewith the icing base of claim 1 in admixture with sugar and water all in proportions to form a stable, fluffy, smooth boiled icing of fine grain.

10. The method of claim 9 in which the gum is gum acacia.

11. The method as in claim 10 in which the icing base component is incorporated portionwise into the sirup.

References Cited in the file of this patent

UNITED STATES PATENTS

| Number | Name | Date |
|---|---|---|
| 1,060,912 | Lasby | May 6, 1913 |
| 2,019,123 | Erickson | Oct. 29, 1935 |
| 2,271,654 | Littlefield | Feb. 3, 1942 |
| 2,474,019 | Steiner et al. | June 21, 1949 |

OTHER REFERENCES

"Everybody's Cookbook," by Lord, Revised Edition, Harcourt, Brace and Co., New York, pages 433 and 434.